(12) United States Patent
Chu et al.

(10) Patent No.: US 11,800,585 B2
(45) Date of Patent: Oct. 24, 2023

(54) METHOD AND APPARATUS FOR WIRELESS COMMUNICATIONS

(71) Applicant: NXP USA, Inc., Austin, TX (US)

(72) Inventors: Liwen Chu, San Ramon, CA (US);
Manish Kumar, Clarksburg, MD (US);
Hongyuan Zhang, Fremont, CA (US);
Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 36 days.

(21) Appl. No.: 17/387,911

(22) Filed: Jul. 28, 2021

(65) Prior Publication Data

US 2022/0039183 A1 Feb. 3, 2022

Related U.S. Application Data

(60) Provisional application No. 63/137,206, filed on Jan. 14, 2021, provisional application No. 63/125,028, filed on Dec. 14, 2020, provisional application No. 63/080,456, filed on Sep. 18, 2020, provisional application No. 63/057,852, filed on Jul. 28, 2020.

(51) Int. Cl.
*H04W 76/12* (2018.01)
*H04W 76/15* (2018.01)
*H04W 80/02* (2009.01)
*H04W 84/12* (2009.01)

(52) U.S. Cl.
CPC ........... *H04W 76/15* (2018.02); *H04W 76/12* (2018.02); *H04W 80/02* (2013.01); *H04W 84/12* (2013.01)

(58) Field of Classification Search
CPC ..... H04W 76/15; H04W 76/12; H04W 80/02; H04W 84/12; H04W 88/10
See application file for complete search history.

(56) References Cited

U.S. PATENT DOCUMENTS

| | | | |
|---|---|---|---|
| 2020/0404496 A1 | 12/2020 | Chu et al. | |
| 2021/0014911 A1* | 1/2021 | Patil | H04W 8/245 |
| 2021/0029588 A1* | 1/2021 | Cariou | H04W 28/0263 |
| 2021/0250848 A1* | 8/2021 | Seok | H04W 36/06 |
| 2021/0321243 A1* | 10/2021 | Patil | H04W 74/006 |
| 2021/0377369 A1* | 12/2021 | Patil | H04W 76/11 |
| 2021/0377851 A1* | 12/2021 | Liu | H04W 52/0206 |

(Continued)

OTHER PUBLICATIONS

IEEE, "Part 11: Wireless LAN Medium Access Control (MAC) and Physical Layer (PHY) Specifications", Section 9.6.7.47, Draft Standard for Information technology—Telecommunications and information exchange between systems Local and metropolitan area networks Specific requirements, Dec. 2020, 149 pgs.

(Continued)

*Primary Examiner* — Lakeram Jangbahadur

(57) ABSTRACT

Embodiments of a method and an apparatus for wireless communications are disclosed. In an embodiment, a method for wireless communications involves transmitting, by a first multi-link device (MLD) to a second MLD, a management frame on at least one of two links associated with the first MLD and the second MLD in a multi-link operation, receiving, by the second MLD from the first MLD, the management frame on at least one of the two links, and operating the second MLD according to the management frame received on at least one of the two links.

17 Claims, 10 Drawing Sheets

(56) References Cited

U.S. PATENT DOCUMENTS

2021/0377928 A1* 12/2021 Seok ................... H04W 72/046
2021/0392571 A1* 12/2021 Kneckt ................ H04W 48/10

OTHER PUBLICATIONS

IEEE, "Part 11: Wireless LAN Medium Access Control (MAC) and Physical Layer (PHY) Specifications", Section 11.31.5, Draft Standard for Information technology—Telecommunications and information exchange between systems Local and metropolitan area networks Specific requirements, Dec. 2020, 149 pgs.

U.S. Appl. No. 17/225,058, "Apparatus and Methods for Multi-Link Communications", filed Apr. 7, 2021, 52 pages.

Au, Edward, "Compendium of straw polls and potential changes to the Specification Framework Document Part 2", 20/1935r11, Jan. 2021, 329 pgs.

* cited by examiner

| NAME | EVENT TYPE |
|---|---|
| TRANSITION | 0 |
| RSNA | 1 |
| PEER-TO-PEER LINK | 2 |
| WNM LOG | 3 |
| RESERVED | 4-220 |
| VENDOR SPECIFIC | 221 |
| RESERVED | 222-255 |

METHOD AND APPARATUS FOR WIRELESS COMMUNICATIONS

CROSS-REFERENCE TO RELATED APPLICATIONS

This application is entitled to the benefit of U.S. Provisional Patent Application Ser. No. 63/057,852, filed on Jul. 28, 2020, and U.S. Provisional Patent Application Ser. No. 63/080,456, filed on Sep. 18, 2020, and U.S. Provisional Patent Application Ser. No. 63/125,028, filed on Dec. 14, 2020, and U.S. Provisional Patent Application Ser. No. 63/137,206, filed on Jan. 14, 2021, each of which is incorporated by reference herein.

BACKGROUND

In wireless communications, wireless devices, e.g., access point (AP) multi-link devices (MLDs) or non-AP MLDs, e.g., STA multi-link devices (STA MLDs (non-AP MLDs)), can execute various wireless operations, such as coordinate some features or operations for devices in a multi-link operation via one or more links. As an example, management frames that include information of at least one of two links may be exchanged between a first MLD (e.g., AP MLD or STA MLD) and a second MLD (e.g., AP MLD or STA MLD) to share information corresponding to at least one of the two links. However, because such multi-link operations may allow a management frame transmitted on a corresponding link (e.g., link 1) to include information of another link (e.g., link 2), current MLDs may not easily support the exchange of management frames in multi-link operations.

SUMMARY

Embodiments of a method and an apparatus for wireless communications are disclosed. In an embodiment, a method for wireless communications involves transmitting, by a first multi-link device (MLD) to a second MLD, a management frame on at least one of two links associated with the first MLD and the second MLD in a multi-link operation, receiving, by the second MLD from the first MLD, the management frame on at least one of the two links, and operating the second MLD according to the management frame received on at least one of the two links.

In an embodiment, the management frame is an MLD level management frame.

In an embodiment, the MLD level management frame includes MLD level information.

In an embodiment, the MLD level management frame includes MLD level information and link level information.

In an embodiment, the link level information includes at least one of a link ID, a Group Temporal Key (GTK), an Integrity GTK (IGTK), and a Beacon IGTK (BIGTK) of at least one of the two links.

In an embodiment, the MLD level management frame that includes the MLD level information and the link level information is at least one of a Security Association (SA) Query Request frame, an SA Query Response frame, a Wireless Network Management (WNM) Request frame, and a WNM Response frame.

In an embodiment, the management frame is a cross-link link level management frame that includes information of a corresponding link and is transmitted on another link.

In an embodiment, the cross-link link level management frame includes a link ID that identifies the corresponding link for a frame body, and where the link ID is indicated in a Media Access Control (MAC) Header portion of the cross-link link level management frame.

In an embodiment, the cross-link link level management frame includes a link ID that identifies the corresponding link for a frame body, and where the link ID is indicated in the frame body of the cross-link link level management frame.

In an embodiment, when the cross-link link level management frame is transmitted on the corresponding link that uses a frame body, the link ID is not included in the frame body.

In an embodiment, when the cross-link link level management frame is transmitted on another link that is different from the corresponding link that uses a frame body, the link ID is included in the frame body.

In an embodiment, the management frame is a link-specific link level management frame that includes information of a corresponding link and is transmitted on the corresponding link.

In an embodiment, the link-specific link level management frame is not transmitted via a cross-link transmission.

In an embodiment, the link-specific link level management frame is at least one of a Time Priority Management frame, a management frame with a Timestamp field, a Transmit Power Control (TPC) Request frame, a TPC Response frame, a Link Measurement Request frame, a Link Measurement Response frame, a Target Wake Time (TWT) Information frame, an Operating Mode Notification frame, and a Spatial Multiplexing (SM) Power Save frame.

In an embodiment, the method involves transmitting the management frame via a cross-link transmission.

In an embodiment, the management frame transmitted via the cross-link transmission includes information of one of the two links, and a link ID in a MAC Header portion of the management frame.

In an embodiment, the management frame transmitted via the cross-link transmission includes information of more than one of the two links, and a link ID in a frame body of the management frame.

In an embodiment, transmitting the management frame via the cross-link transmission involves transmitting an updated on-channel tunnel (OCT) Request frame on a reporting link and encapsulating a reported link management frame.

In an embodiment, at least one of the first MLD and the second MLD operates in accordance with an 802.11be communications protocol.

An embodiment of a wireless communications system is also disclosed. In an embodiment, the wireless communications system includes a first MLD, where the first MLD includes a processor configured to transmit, to a second MLD, a management frame on at least one of two links associated with the first MLD and the second MLD in a multi-link operation, and a second MLD, where the second MLD includes another processor configured to receive, from the first MLD, the management frame on at least one of the two links, and operate according to the management frame received on at least one of the two links.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 2 is a table that represents Event Type field definitions for Event Requests and Event Reports.

Throughout the description, similar reference numbers may be used to identify similar elements.

DETAILED DESCRIPTION

Figure 1:
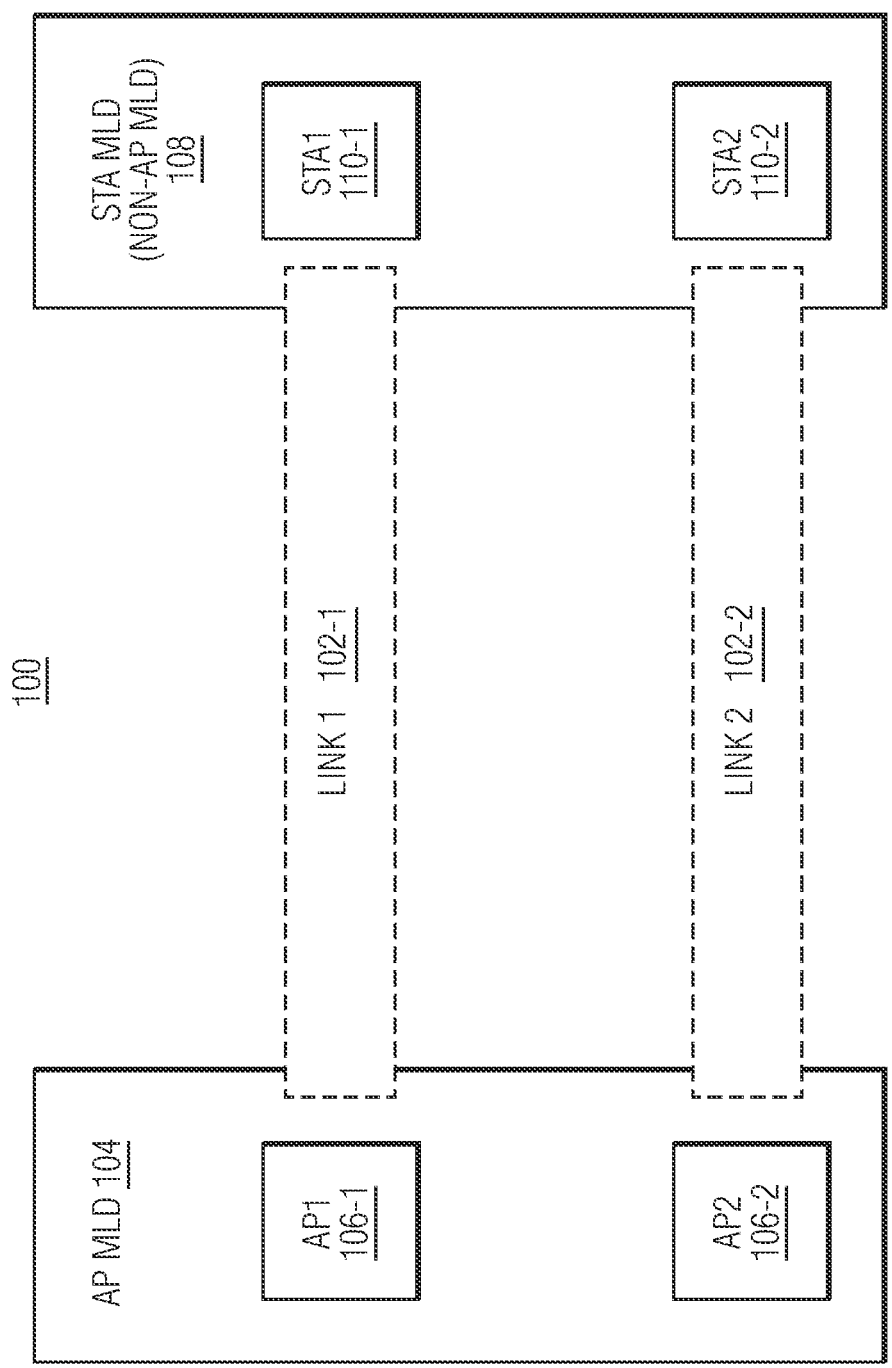
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., an access point (AP) multi-link device (MLD) of a wireless local area network (WLAN) may transmit data to at least one associated station (STA) MLD. The AP MLD may be configured to operate with associated STA MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple STA MLDs, or multiple AP MLDs with more than one STA MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, implemented as APs 106-1 and 106-2. In such an embodiment, the APs may be AP1 106-1 and AP2 106-2. In some embodiments, a common part of the AP MLD 104 implements upper layer Media Access Control (MAC) functionalities (e.g., beacon acknowledgement establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a local area network (e.g., a LAN) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 MHz BSS operating channel at 6 GHz band and AP2 106-2 may operate in a 160 MHz BSS operating channel at 5 GHz band. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD may be a communications device that wirelessly connects to a wireless AP MLD. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface.

In some embodiments, the AP MLD 104 and/or the STA MLD 108 may identify which communication links support multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link 1 102-1 and link 2 102-2. For example, each of the non-AP STAs 110-1 or 110-2 communicates with an AP 106-1 or 106-2 via corresponding communication links 102-1 or 102-2. In an embodiment, a communication link (e.g., link 1 102-1 or link 2 102-2) may include a BSS operating channel established by an AP (e.g., AP1 106-1 or AP2 106-2) that features multiple 20 MHz channels used to transmit frames (e.g., Physical Layer Convergence Protocol (PLCP) Protocol Data Units (PPDUs), Beacon frames, management frames, etc.) between a first wireless device (e.g., an AP, an AP MLD, an STA, or an STA MLD) and a second wireless device (e.g., an AP, an AP MLD, an STA, or an STA MLD). In some embodiments, a 20 MHz channel may be a punctured 20 MHz channel or an unpunctured 20 MHz channel. Although the STA MLD 108 is shown in FIG. 1 as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicate) with the STA MLD 108 via more than two communication links or less than two communication links.

In some embodiments, a first MLD, e.g., an AP MLD or non-AP MLD (STA MLD), may transmit management frames in a multi-link operation with a second MLD, e.g., STA MLD or AP MLD, to coordinate the multi-link operation between the first MLD and the second MLD. As an example, a management frame may be a (Re)Association Request frame, a (Re)Association Response frame, a Beacon frame, a Disassociation frame, an Authentication frame, a Block Acknowledgement (Ack) (BA) Action frame, etc. According to the 802.11be communication protocol, management frames may be transmitted via a cross-link transmission. As an example, a cross-link management frame transmission may involve a management frame being transmitted and/or received on one link (e.g., link 1 102-1) while carrying information of another link (e.g., link 2 102-2). Thus, frame formats and transmission techniques for management frames transmitted and/or received via a cross-link transmission may need to be defined for MLDs operating in accordance with the 802.11be communication protocol.

Techniques for cross-link management frame transmissions in accordance with the 802.11be communication protocol are described herein.

In accordance with an embodiment of the invention, a technique for wireless communications involves transmitting, by a first MLD to a second MLD, a management frame on at least one of two links associated with the first MLD and the second MLD in a multi-link operation, receiving, by the second MLD from the first MLD, the management frame on at least one of the two links, and operating the second MLD according to the management frame received on at least one of the two links. In some embodiments, the first MLD may be an AP MLD (or an STA MLD) and the second MLD may be an STA MLD (or an AP MLD). In some embodiments, the first MLD and the second MLD may be switched, such that the second MLD may transmit the management frame while the first MLD may receive the management frame on at least one of the two links and operate according to the management frame. Although the first MLD may be described as being associated with the second MLD via at least two links, the at least two links may be more than two links and may sometimes be referred to herein as "multiple links".

In an embodiment, a management frame that may be "MLD level", i.e., includes MLD level information, may be transmitted on any link (e.g., at least one of two links or at least one of multiple links) between a first MLD (e.g., AP MLD 104) and a second MLD (e.g., STA MLD 108). As an example, an "MLD level" management frame may imply that the management frame includes information for the MLD level and may be transmitted between a first MLD and a second MLD on any link (e.g., at least one of two links or at least one of multiple links) associated with the first MLD and the second MLD. In such an embodiment, the management frame that includes the information for the MLD level may be referred to herein as an "MLD level management frame". In some embodiments, the MLD level management frame may also include link level information.

In some embodiments, MLD level management frames include BA-related Action frames and Generic Advertisement Service (GAS) related Action frames, such that the GAS related Action frames may acquire MLD level information. In some embodiments, the MLD level management frames include Quality of Service (QoS) Management Frame (QMF) Policy related Action frames. In such an embodiment, a QMF Policy may be at an MLD level because with different QMF Policies, different transmit sequence number spaces, different Packet Numbers (PN), different receive sequence spaces, and different receive PN may be applied to a management frame. In some embodiments, the MLD level management frame may include a Public Key, such that the Public Key may be MLD level information. In some embodiments, the MLD level management frames may include BSS Transition related Action frames, e.g., BSS Transition Management Query frames, BSS Transition Management Request frames, and/or BSS Transition Management Response frames.

In some embodiments, MLD level management frames include Traffic Filter Service (TFS) related Action frames for traffic filtering and QoS Traffic Capability related Action frames, such that specific allowed frames may be the same for each link. In some embodiments, the MLD level management frames include Wireless Network Management (WNM) Notification Request frames and WNM Notification Response frames where notifications may be defined, such that a Firmware Update Notification may be transmitted at an MLD level. In some embodiments, the MLD level management frames include WNM Sleep Mode Request frames and WNM Sleep Mode Response frames. In some embodiments, the WNM Sleep Mode Request frames and the WNM Sleep Mode Response frames may include per link information, such that the per link information may include different group keys (e.g., a Group Temporal Key (GTK), an Integrity GTK (IGTK), and a Beacon IGTK (BIGTK)) for different links. In one embodiment, the per link information for each link may be explicitly identified by a link ID of the link. In some embodiments, Security Association (SA) Query Request frames and/or SA Query Response frames may be MLD level management frames with link level information. In some embodiments, the SA Query Request frames and/or the SA Query Response frames may include the per link information, such that the per link information includes different Operating Channel Information (OCI) for different links. In some embodiments, the MLD level management frames include Fast Initial Link Setup (FILS) Container frames, such that the FILS Container frames may be MLD level management frames. In some embodiments, features related to the MLD level management frames may be MLD level features, e.g., MLD level management frame features may include FILS, WNM sleep mode, TFS, etc. In some embodiments, the MLD level management frames include an Event Request or an Event Report, e.g., a Transition Event and/or a Robust Security Network Association (RSNA) Event.

An example of a table that defines Event Type field definitions for Event Requests and Event Reports is described in further detail with reference to FIG. 2.

FIG. 2 is a table, 200, that represents Event Type field definitions for Event Requests and Event Reports. In particular, the table 200 shown in FIG. 2 includes two columns, implemented as a first column (shown by "Name") and a second column (shown by "Event Type"). With reference to FIG. 2, an Event Type of 0 defines a Transition, an Event Type of 1 defines an RSNA, an Event Type of 2 defines a Peer-to-peer link, an Event Type of 3 defines a WNM log, an Event Type of 4-220 defines Reserved, an Event Type of 221 defines Vendor Specific, and an Event Type of 225-255 defines Reserved.

In an embodiment, an MLD level management frame may include MLD level information (e.g., BA management frames). In another embodiment, the MLD level management frame may include MLD level information and link level information (e.g., WNM Sleep Mode Request/Response where the WNM Sleep Mode Request/Response includes (i) link level information, i.e., for each link, one group of GTK, IGTK, BIGTK, and OCI may be identified by a link ID of a link, and includes (ii) MLD level information, i.e., a WNM Sleep Mode element). In an embodiment, the MLD level management frames that include the MLD level information and the link level information may be management frames that include an OCI Element (e.g., SA Query Request frames, SA Query Response frames, WNM Sleep Mode Request frames, WNM Sleep Mode Response frames, etc.). As an example, per link information of MLD level management frames may be included in Per STA Profiles of a multi-link element, such that the Per STA Profiles may include a link ID, GTK, IGTK, and/or BIGTK of different links (e.g., at least one of two links). In addition, the Per STA Profiles may include the link ID and OCI Element of different links.

An example of a multi-link element is described in further detail with reference to FIG. 3.

Figure 3:
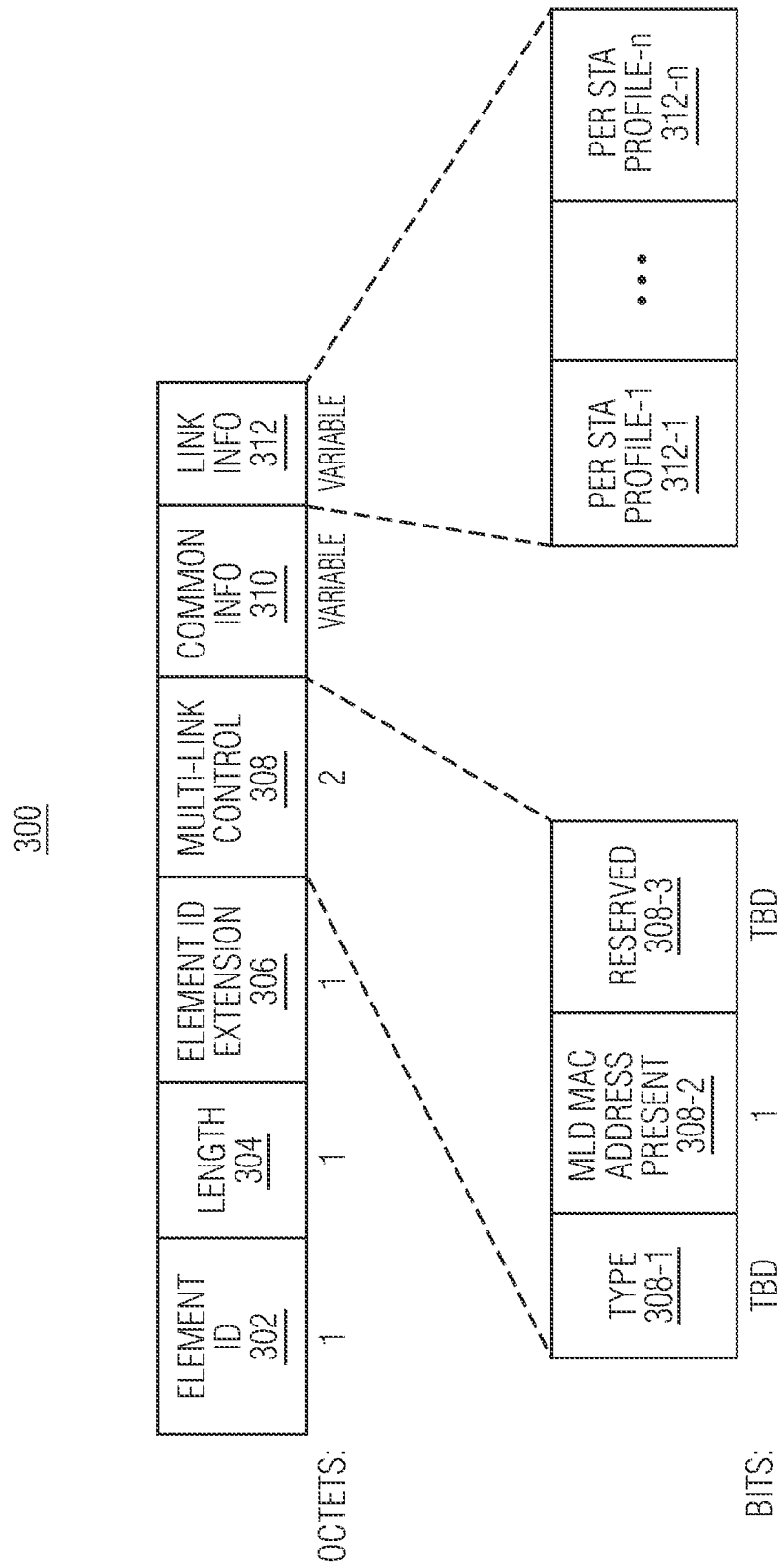
FIG. 3 depicts an example of a frame body of a multi-link element in accordance with an embodiment of the invention.

FIG. 3 depicts an example of a frame body of a multi-link element, 300, in accordance with an embodiment of the invention. In some embodiments, the multi-link element 300 may be transmitted by an MLD (e.g., first MLD or second MLD) in a multi-link operation. In some embodiments, an MLD (e.g., first MLD or second MLD) that receives the multi-link element 300 may operate according to the multi-link element 300. In some embodiments, the multi-link element 300 may be included in an MLD level management frame (not shown) that includes MLD level information and link level information. With reference to FIG. 3, the frame body of the multi-link element 300 is shown as including six fields, implemented as a first field, Element ID 302 (1 octet), a second field, Length 304 (1 octet), a third field, Element ID Extension 306 (1 octet), a fourth field, Multi-Link Control 308 (2 octets), a fifth field, Common Info 310 (variable octets), and a sixth field, Link Info 312 (variable octets).

With reference to FIG. 3, in an embodiment, Multi-Link Control 308 of the multi-link element 300 is shown as including three subfields, implemented as a first subfield, Type 308-1 (To Be Determined (TBD) bits), a second subfield, MLD MAC Address Present 308-2 (1-bit), and a third subfield, Reserved 308-3 (TBD bits). As an example, different multi-link elements may have different Type values, or the same Type value as determined by at least one bit in Type 308-1. In an embodiment, Link Info 312 of the multi-link element 300 is shown as including at least one subfield, implemented as a first subfield, Per STA Profile-1 312-1 and optional additional subfield(s), Per STA Profile-n 312-n (n may be an integer greater than 1).

In an embodiment, a management frame may be a "link level" management frame where a frame body includes information for a link (e.g., a link level management frame includes management information for link 1 102-1, such that link 1 may be a corresponding link (frame body may be applied to link 1)) between a first MLD (e.g., AP MLD 104) and a second MLD (e.g., STA MLD 108). In an embodiment, the link level management frame may be a cross-link link level management frame, such that the cross-link link level management frame may include management information of a corresponding link (e.g., link 2 102-2 (reported link)) and may be transmitted on another link (e.g., link 1 102-1 (reporting link)). In another embodiment, a link level management frame may be a link-specific link level management frame, such that the link-specific link level management frame may include information of a corresponding link (e.g., link 2 102-2) and may (only) be transmitted on the corresponding link (e.g., link 2 102-2).

In some embodiments, support capability of cross-link link level management frames may be an optional feature at an MLD (e.g., AP MLD or non-AP MLD). In such an embodiment, the support capability of cross-link link level management frames may be announced via an MLD EHT capability or an MLD Capabilities element. In an embodiment, when a recipient (e.g., second MLD) of a link level management frame that may be transmitted via a cross-link transmission announces that the recipient may not support the link level management frame transmitted via the cross-link transmission, the link level management frame may only be transmitted on a link where the link level management frame may be used.

According to a first cross-link link level management frame transmission technique, a frame body of a cross-link link level management frame may include a link ID and may not change when different links (e.g., link 1 102-1 or link 2 102-2) are used to transmit the cross-link link level management frame. In an embodiment, cross-link link level management frames transmitted according to the first cross-link link level management frame transmission technique may be retransmitted on any link (e.g., at least one of two links) using the same frame format.

In one embodiment of the first cross-link link level management frame transmission technique, the link ID that identifies a corresponding link (e.g., link 1 102-1) for a frame body may be indicated in a MAC Header portion of the cross-link link level management frame. For example, the link ID may be indicated in an HE Control field or an Address 3 field as a related BSS ID (BSSID) of the corresponding link. In such an example, the Address 3 field may need a specific design to indicate the link ID for Tunneled Direct Link Setup (TDLS) management frames when multi-link TDLS between two non-AP MLDs is established via a legacy AP. In one embodiment, a link (e.g., link 1 102-1) related to a legacy AP may have a link ID of 0. In another embodiment, a link with a link ID other than 0 (e.g., link 2 102-2) may have a dummy AP whose BSSID may be the combination of the legacy AP's BSSID and the link ID of link 2.

In another embodiment of the first cross-link link level management frame transmission technique, the link ID that identifies a corresponding link (e.g., link 1 102-1) where a frame body is applied may be included in the frame body of the cross-link link level management frame when the cross-link management frame is transmitted on any link (e.g., at least one of two links). In one embodiment, a new defined element in the frame body of the cross-link link level management frame may indicate the link ID where the frame body may be applied. In another embodiment, management information of a link on the cross-link link level management frame may be included in a Per Link (STA) Profile of a multi-link element. In such an embodiment, the Per Link (STA) Profile may include a link ID, management information, and where the management information may be applied. Additionally, in another embodiment, a frame body of a new defined on-channel tunnel (OCT) frame may include the link ID, a Category, an Action ID, a length (of an encapsulated Management MAC Protocol Data Unit (MMPDU) frame body), an MMPDU subtype of an encapsulated MMPDU, and an encapsulated MMPDU frame body.

According to a second cross-link link level management frame transmission technique, a frame body of a cross-link link level management frame may (or may not) include a link ID and may change when different links (e.g., link 1 102-1 or link 2 102-2) are used to transmit the cross-link link level management frame. In an embodiment, cross-link link level management frames transmitted according to the second cross-link link level management frame transmission technique may not always be retransmitted on any link (e.g., at least one of two links) using the same frame format. In such an embodiment, cross-link link level management frames retransmitted on another link (e.g., link 2 102-2) after being transmitted on a corresponding link (e.g., link 1 102-1) may need a different frame format. However, if the cross-link link level management frame is retransmitted on the corresponding link where a frame body may be applied (e.g., link 1 102-1) after being initially transmitted on the corresponding link, the cross-link link level management frame may have the same format. In an embodiment, when the cross-link link level management frame is transmitted on the corresponding link (e.g., link 1 102-1) that uses a frame body, the link ID may not be included in the frame body. In another embodiment, when the cross-link link level management frame is transmitted on another link (e.g., link 2 102-2) that may be different from the corresponding link (e.g., link 1 102-1) that uses a frame body, the link ID may be included in the frame body.

In some embodiments, management frames that may not be transmitted via a cross-link link level transmission may be link-specific link level management frames. In such an embodiment, the link-specific link level management frames may include information of a corresponding link (e.g., at least one of two links) associated with a first MLD and a second MLD, and may only be transmitted on the corresponding link, such that the link-specific link level management frames may not include a link ID where the frame body may be applied.

In some embodiments, link-specific link level management frames, e.g., Time Priority Management frames and/or management frames with a Timestamp field, may not be allowed to be transmitted via a cross-link transmission. In some embodiments, however, a unicast management frame with a Timestamp field may be transmitted via a cross-link transmission. In some embodiments, link-specific link level management frames may include sounding related frames (e.g., 802.11n sounding related Action frames, 802.11ac sounding related Action frames, 802.11ax sounding related Action frames, and/or 802.11be sounding related Action frames) and range measurement feedback frames (e.g., Null Data Packet (NDP) ranging feedback frames and Fine Timing Measurement (FTM) Action frames). In such examples, a negotiation related to a feature of the Time Priority Management frames, e.g., the NDP ranging feedback frames and the FTM Action frames, may be a link level negotiation.

In some embodiments, link-specific link level management frames may include Transmit Power Control (TPC) Request frames or TPC Response frames. In some embodiments, the link-specific link level management frames may include measurement related management frames (e.g., Link Measurement Request frames and Link Measurement Response frames). In some embodiments, the link-specific link level management frames may include Target Wake Time (TWT) Information frames. In some embodiments, the TWT Information frames may be used to suspend and resume a TWT Service Period (SP). In some embodiments, the link-specific link level management frames may include Operating Mode Notification frames and Spatial Multiplexing (SM) Power Save frames, such that the Operating Mode Notification frames and the SM Power Save frames may each be notification frames. In such an embodiment, a notification frame may be difficult to predict when an AP or an STA of a target link for a peer MLD (e.g., an MLD associated with another MLD) receives information included in the notification frame. Other examples of link-specific link level management frames may include other notification frames such as, e.g., a notification frame without a request or a notification frame with a response handshake.

Examples of link-specific link level management frame exchanges in a wireless communications system are described in further detail with reference to FIGS. 4A-4B.

Figure 4A:
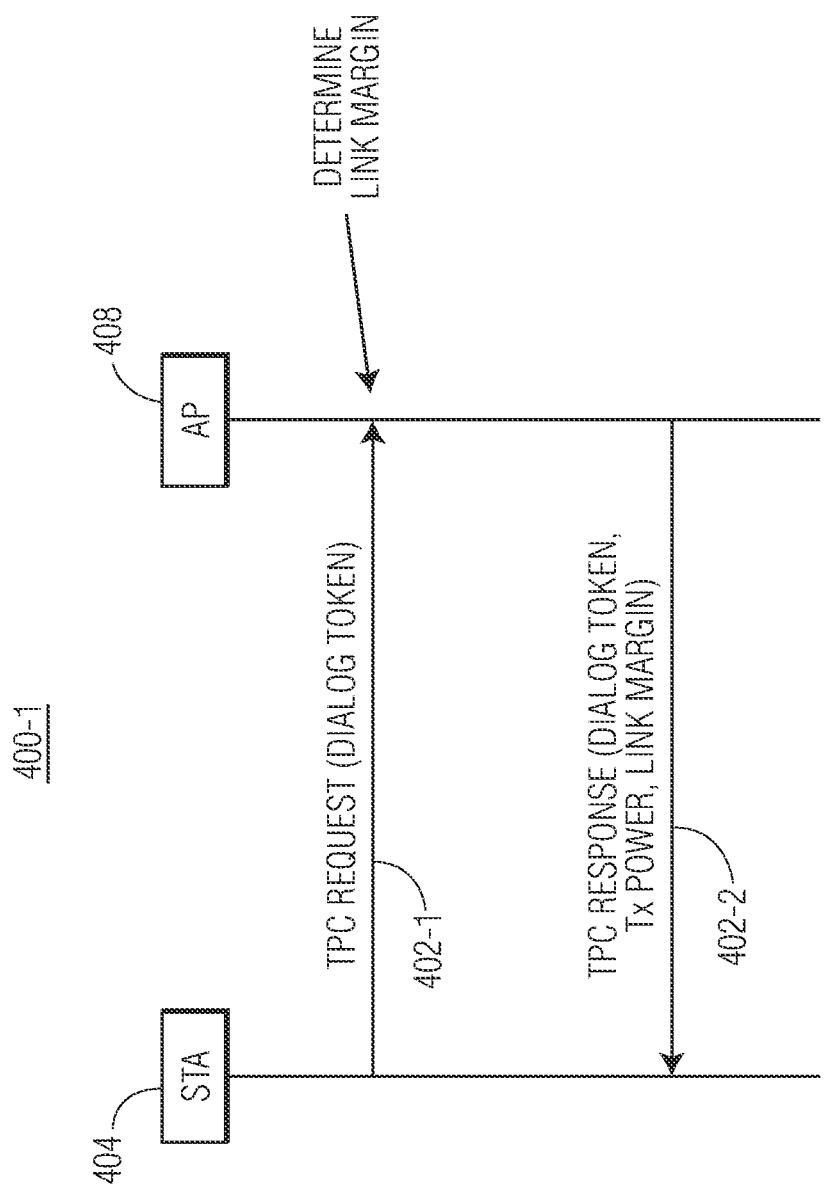
FIG. 4A illustrates an example of a link-specific link level management frame exchange in a wireless communications system in accordance with an embodiment of the invention.

FIG. 4A illustrates an example of a link-specific link level management frame exchange in a wireless communications system, 400-1, in accordance with an embodiment of the invention. In particular, the wireless communications system 400-1 in FIG. 4A is shown as including an STA and an AP, implemented as STA 404 and AP 408, respectively. In an embodiment, the STA 404 may be part of an STA MLD (not shown) (e.g., second MLD) and the AP 408 may be part of an AP MLD (not shown) (e.g., first MLD). With reference to FIG. 4A, the STA 404 is shown as first transmitting (shown by arrow 402-1) a TPC Request frame that includes a Dialog Token (shown by "TPC Request (Dialog Token)") to the AP 408 on a corresponding link (not shown). In such an embodiment, the AP 408 may determine a link margin once the TPC Request frame is received (shown by "Determine link margin"). In such an embodiment, the AP 408 may then transmit, in a second transmission (shown by arrow 402-2), a TPC Response frame that includes the Dialog Token, Transmission (Tx) Power, and the determined link margin (shown by "TPC Response (Dialog Token, Tx Power, link margin)") to the STA 404 on the corresponding link. In such an embodiment, the TPC Request frame and the TPC Response frame may each be link-specific link level management frames.

Figure 4B:
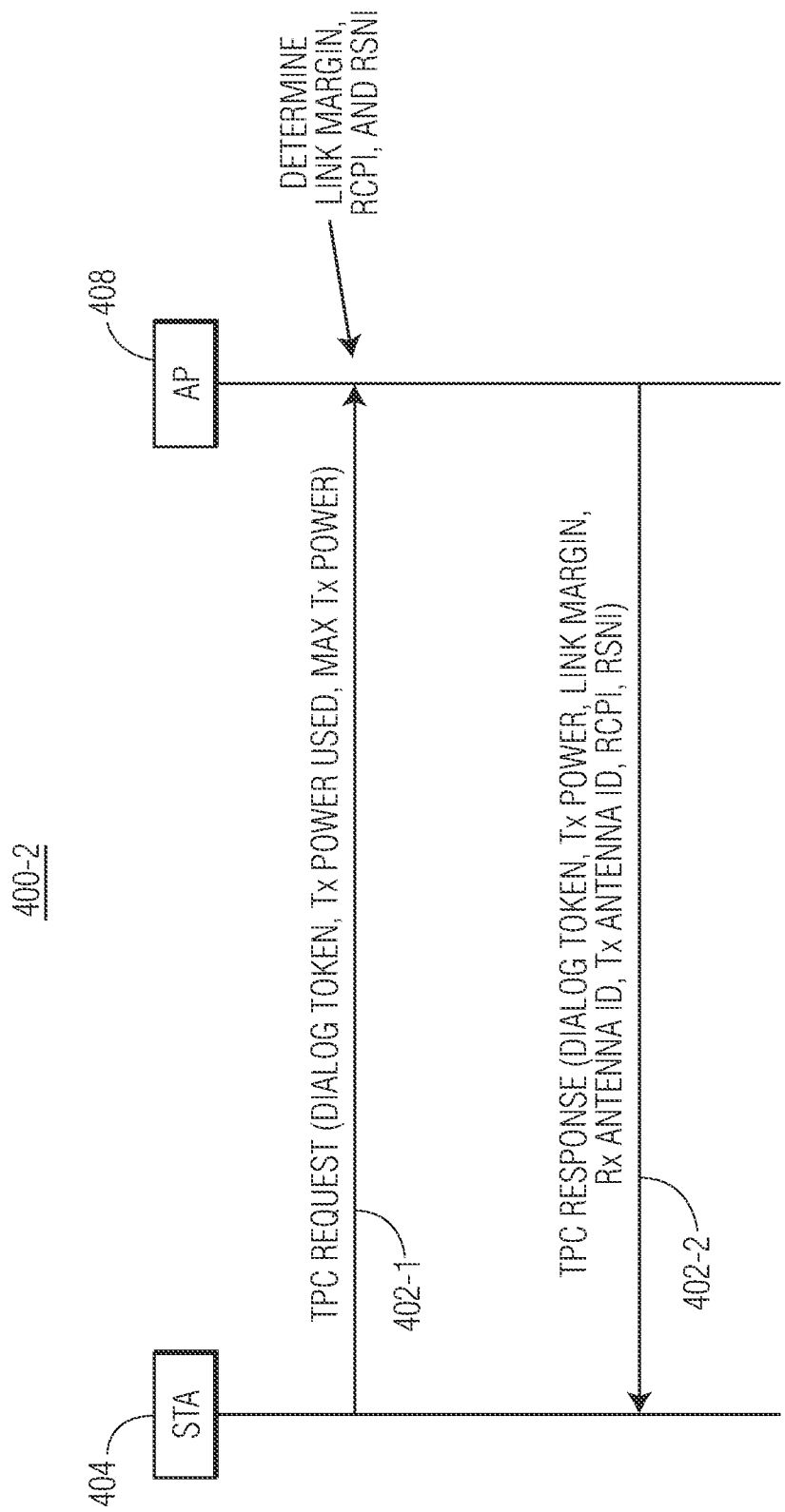
FIG. 4B illustrates another example of a link-specific link level management frame exchange in a wireless communications system in accordance with an embodiment of the invention.

FIG. 4B illustrates another example of a link-specific link level management frame exchange in a wireless communications system, 400-2, in accordance with an embodiment of the invention. In particular, the wireless communications system 400-2 in FIG. 4B is shown as including an STA and an AP, implemented as STA 404 and AP 408, respectively. In an embodiment, the STA 404 may be part of an STA MLD (not shown) (e.g., second MLD) and the AP 408 may be part of an AP MLD (not shown) (e.g., first MLD). With reference to FIG. 4B, the STA 404 is shown as first transmitting (shown by arrow 402-1) a TPC Request frame that includes a Dialog Token, a Tx Power used, and a Max Tx Power (shown by "TPC Request (Dialog Token, Tx Power used, Max Tx Power)") to the AP 408 on a corresponding link (not shown). In such an embodiment, the AP 408 may determine a link margin, a Received Channel Power Indicator (RCPI), and a Received Signal-to-Noise Indicator (RSNI) once the TPC Request frame is received (shown by "Determine link margin, RCPI, and RSNI"). In such an embodiment, the AP 408 may then transmit, in a second transmission (shown by arrow 402-2), a TPC Response frame that includes the Dialog Token, the Tx Power, the determined link margin, a Receiver (Rx) Antenna ID, a Tx Antenna ID, the RCPI, and the RSNI (shown by "TPC Response (Dialog Token, Tx Power, link margin, Rx Antenna ID, Tx Antenna ID, RCPI, RSNI)") to the STA 404 on the corresponding link. In such an embodiment, the TPC Request frame and the TPC Response frame may each be link-specific link level management frames.

In one embodiment, a link level management frame that may be transmitted via a cross-link transmission may include information of one of two links (e.g., information of one of multiple links) and link information (e.g., link ID or Address 3) in a MAC Header portion of the management frame. In another embodiment, the link level management frame that may be transmitted via the cross-link transmission may include information of more than one of the two links (e.g., information of more than one of multiple links) and a link ID in a frame body of the management frame. In an embodiment, a MLD level management frame may be transmitted via any link (e.g., at least one of the two links) without explicit link ID indication in MAC header.

Examples of management frames that may be transmitted via a cross-link transmission are described in detail with reference to FIGS. 5A-5B.

Figure 5A:
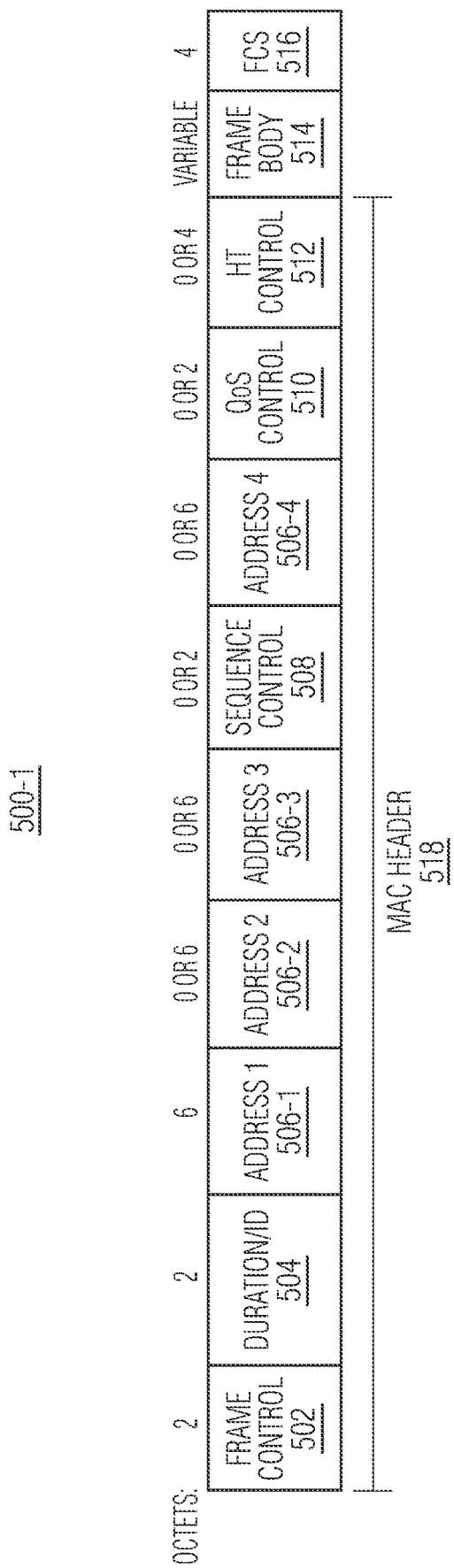
FIG. 5A depicts an example of a frame body of a management frame that may be transmitted via a cross-link transmission in accordance with an embodiment of the invention.

FIG. 5A depicts an example of a frame body of a management frame, 500-1, that may be transmitted via a cross-link transmission in accordance with an embodiment of the invention. In some embodiments, the management frame 500-1 may be transmitted by an MLD (e.g., first MLD or second MLD) via the cross-link transmission. In some embodiments, an MLD (e.g., first MLD or second MLD) that receives the management frame 500-1 may operate according to the management frame 500-1.

With reference to FIG. 5A, the management frame 500-1 is shown as including eleven fields, implemented as a first field, Frame Control 502 (2 octets), a second field, Duration/ID 504 (2 octets), a third field, Address 1 506-1 (6 octets), a fourth field, Address 2 506-2 (0 or 6 octets), a fifth field, Address 3 506-3 (0 or 6 octets), a sixth field, Sequence Control 508 (0 or 2 octets), a seventh field, Address 4 506-4 (0 or 6 octets), an eighth field, QoS Control 510 (0 or 2 octets), a ninth field, High Throughput (HT) Control 512 (0 or 4 octets), a tenth field, Frame Body 514 (variable octets), and an eleventh field, Frame Check Sequence (FCS) 516 (4 octets). In an embodiment, a MAC Header portion, 518, of the management frame 500-1 includes Frame Control 502, Duration/ID 504, Address 1 506-1, Address 2 506-2, Address 3 506-3, Sequence Control 508, Address 4 506-4, QoS Control 510, and HT Control 512.

With further reference to FIG. 5A, the management frame 500-1 may be, e.g., a cross-link link level management frame. In an embodiment, the management frame 500-1 may include information of one of two links (e.g., information of one of multiple links) and a link ID in the MAC Header portion 518 of the management frame. As an example, the link ID may be included in an HE Control field within HT Control 512. As another example, the link ID where a frame body may be applied may be determined via Address 3 506-3 of the management frame 500-1. In an embodiment, the management frame 500-1 may be retransmitted on another link (e.g., link 2 102-2) after being transmitted on a corresponding link (e.g., link 1 102-1) by keeping the link ID to indicate a link where the frame body may be applied in the MAC Header portion 518. In some embodiments, link ID information may not be included in the MAC Header portion 518 of the management frame 500-1. In such an embodiment, the management frame 500-1 may include the link ID of a link (e.g., one of two or more links) where the frame body of the management frame 500-1 may be applied.

Figure 5B:
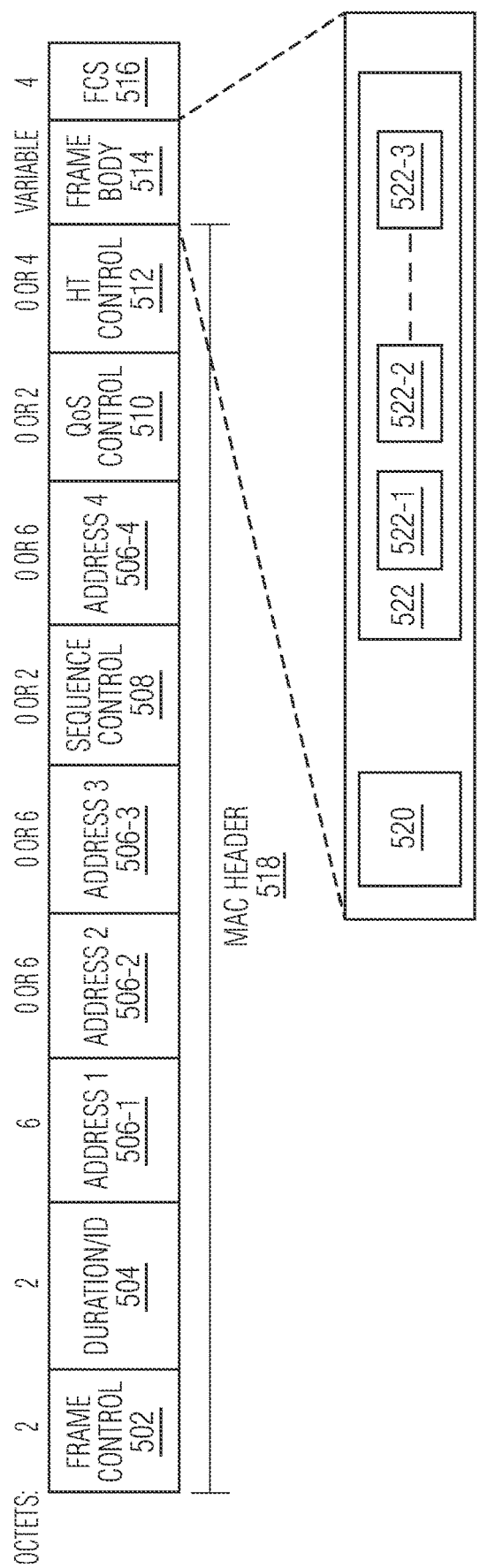
FIG. 5B depicts another example of a frame body of a management frame that may be transmitted via a cross-link transmission in accordance with an embodiment of the invention.

FIG. 5B depicts another example of a frame body of a management frame, 500-2, that may be transmitted via a cross-link transmission in accordance with an embodiment of the invention. In some embodiments, the management frame 500-2 may be transmitted by an MLD (e.g., first MLD or second MLD) via the cross-link transmission. In some embodiments, an MLD (e.g., first MLD or second MLD) that receives the management frame 500-2 may operate according to the management frame 500-2.

With reference to FIG. 5B, the management frame 500-2 is shown as including eleven fields, implemented as a first field, Frame Control 502 (2 octets), a second field, Duration/ID 504 (2 octets), a third field, Address 1 506-1 (6 octets), a fourth field, Address 2 506-2 (0 or 6 octets), a fifth field, Address 3 506-3 (0 or 6 octets), a sixth field, Sequence Control 508 (0 or 2 octets), a seventh field, Address 4 506-4 (0 or 6 octets), an eighth field, QoS Control 510 (0 or 2 octets), a ninth field, HT Control 512 (0 or 4 octets), a tenth field, Frame Body 514 (variable octets), and an eleventh field, FCS 516 (4 octets). In an embodiment, a MAC Header portion, 518, of the management frame 500-2 includes Frame Control 502, Duration/ID 504, Address 1 506-1, Address 2 506-2, Address 3 506-3, Sequence Control 508, Address 4 506-4, QoS Control 510, and HT Control 512.

With further reference to FIG. 5B, in some embodiments, Frame Body 514 of the management frame 500-2 may include two subfields, implemented as a first subfield 520 and a second subfield 522. In such an embodiment, the first subfield 520 may include information of a reporting link (e.g., a link on which a management frame may be transmitted) as defined by a management subtype other than Action, action category, and action field for an Action frame. In such an embodiment, the second subfield 522 may be a multi-link (ML) information element (IE) that includes three subtype fields, implemented as a first subtype field 522-1, a second subtype field 522-2, and a third subtype field 522-3. In such an embodiment, the first subtype field 522-1 may be ML Common Info, while the second subtype field 522-2 and the third subtype field 522-3 may include information of reported links (e.g., links for which a management frame includes information of, but may not be transmitted on) as defined by a management subtype other than Action, action category, and action field for an Action frame.

With further reference to FIG. 5B, the management frame 500-2 may be, e.g., a cross-link link level management frame. In an embodiment, the management frame 500-2 may include information of more than one of two links (e.g., information of more than one of multiple links) and a link ID for each link whose management information may be included in Frame Body 514 of the management frame. As an example, the link ID(s) may be included Frame Body 514 with related link information of reported links, such that management information of the reported links may be included in Frame Body 514. In an embodiment, the frame body of the management frame 500-2 may need to be changed when retransmitted on another link (e.g., link 2 102-2) after being transmitted on a corresponding link (e.g., link 1 102-1) whose management information may be carried. In one embodiment, changing the frame body of the management frame 500-2 may involve ML IE (e.g., second subfield 522) including Per Link Profile(s) that carry cross-link management information (e.g., link ID(s) of reported link(s)). In another embodiment, changing the frame body of the management frame 500-2 may involve Frame Body 514 carrying an element with link ID(s) of reported link(s).

In some embodiments, transmitting a management frame (e.g., an MLD level management frame and/or a cross-link link level management frame) via a cross-link transmission may involve transmitting an updated OCT Request frame on a reporting link and encapsulating a reported link management frame.

An example of a cross-link transmission via an updated OCT Request frame is described in further detail with reference to FIG. 6.

Figure 6:
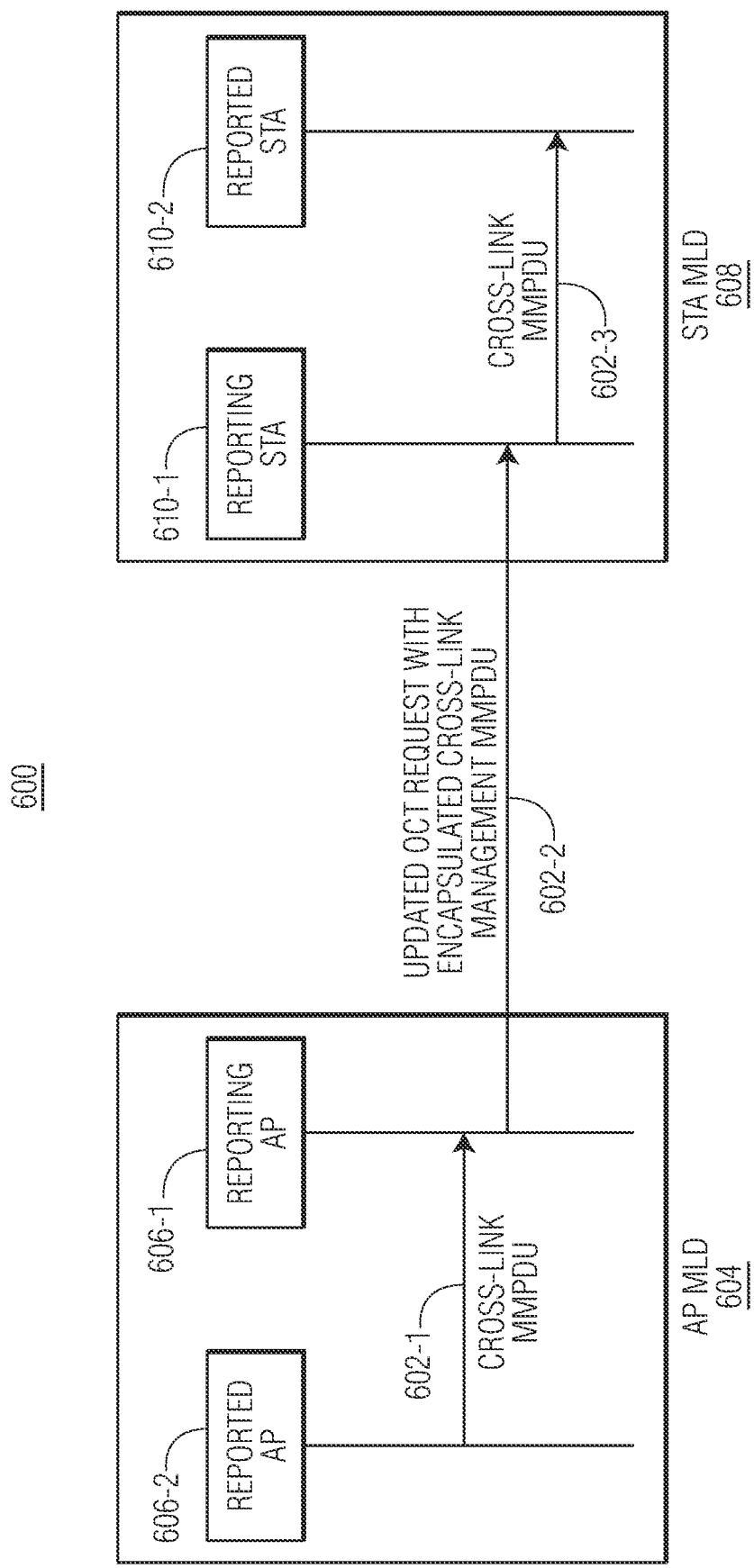
FIG. 6 illustrates an example of a cross-link transmission via an updated on-channel tunnel (OCT) Request frame in a wireless communication system in accordance with an embodiment of the invention.

FIG. 6 illustrates an example of a cross-link transmission via an updated OCT Request frame in a wireless communication system, 600, in accordance with an embodiment of the invention. In particular, FIG. 6 is shown as including an AP MLD (e.g., first MLD) and an STA MLD (non-AP MLD) (e.g., second MLD), implemented as AP MLD 604 and STA MLD 608, respectively. With reference to FIG. 6, the AP MLD 604 is shown as including a reporting AP 606-1 and a reported AP 606-2, and the STA MLD 608 is shown as including a reporting STA 610-1 and a reported STA 610-2. In an embodiment, the reporting AP 606-1 of the AP MLD 604 and the reporting STA 610-1 of the STA MLD 608 may communicate via a reporting link (not shown).

With reference to FIG. 6, the cross-link transmission involves three steps, implemented as a first step shown by a first arrow 602-1, a second step shown by a second arrow 602-2, and a third step shown by a third arrow 602-3. In an embodiment, the first step shown by the first arrow 602-1 may involve the reported AP 606-2 transmitting a first cross-link MMPDU (shown by "cross-link MMPDU") to the reporting AP 606-1. In an embodiment, once the reporting AP 606-1 receives the first cross-link MMPDU, the reporting AP 606-1 may transmit, during the second step shown by the second arrow 602-2, an updated OCT Request frame that includes an encapsulated cross-link management MMPDU (shown by "updated OCT Request with encapsulated cross-link management MMPDU") to the reporting STA 610-1. In an embodiment, the reporting STA 610-1 may receive the updated OCT Request frame and transmit, during the third step shown by the third arrow 602-3, a second cross-link MMPDU (shown by "cross-link MMPDU") to the reported STA 610-2.

In some embodiments, an updated OCT Request frame may include an OCT MMPDU Descriptor element and a link ID where an encapsulated MMPDU may be applied. In one embodiment, the link ID may be included in an element before or after the OCT MMPDU Descriptor element. In another embodiment, the link ID may be included in a field before the OCT MMPDU Descriptor element. In some embodiments, a protected updated OCT Request Action frame and an updated OCT Request Action no Ack frame may also be defined.

In some embodiments, cross-link link level management frames may be transmitted in a multi-link operation, e.g., via a cross-link transmission, and may include information of more than one of two links (e.g., information of more than one of multiple links), such that the management frames may include information of reported links. In one embodiment, the management frames may include critical information (e.g., Enhanced Channel Distribution Access (EDCA) parameters, BSS Color Change, etc.) of the reported link(s). In another embodiment, the management frames may include the critical information of the reported link(s) and other management information (e.g., Group ID management VHT down-link (DL) multi-user (MU) transmission of a link) of the reported link(s).

An example of a management frame that may be transmitted in a multi-link operation is described in further detail with reference to FIG. 7.

Figure 7:
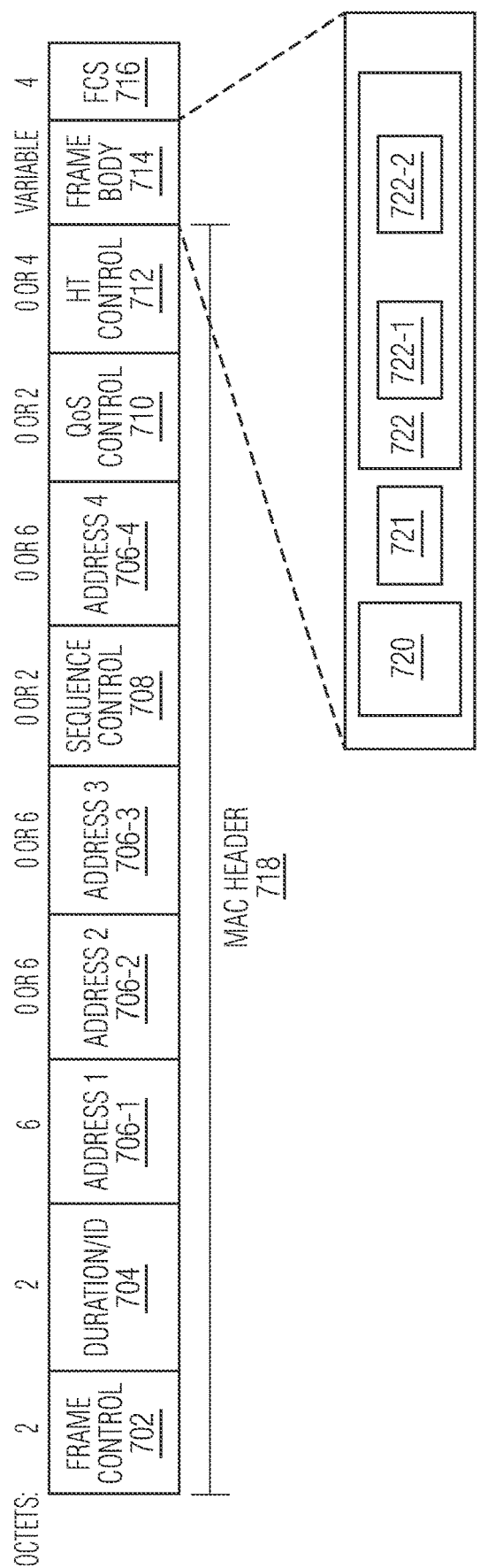
FIG. 7 depicts an example of a frame body of a management frame that may be transmitted in a multi-link operation in accordance with an embodiment of the invention.

FIG. 7 depicts an example of a frame body of a management frame, 700, that may be transmitted in a multi-link operation in accordance with an embodiment of the invention. In some embodiments, the management frame 700 may be transmitted by an MLD (e.g., first MLD or second MLD) in the multi-link operation. In some embodiments, an MLD (e.g., first MLD or second MLD) that receives the management frame 700 may operate according to the management frame 700. In one embodiment, the management frame 700 may include critical information (e.g., EDCA parameters, BSS Color Change, etc.) of a reported link (e.g., link 2 102-2) while being transmitted on a reporting link (e.g., link 1 102-1). In another embodiment, the management frame 700 may include critical information (e.g., EDCA parameters, BSS Color Change, etc.) and other information (e.g., Group ID management for VHT DL MU transmission of a link) of a reported link (e.g., link 2 102-2) while being transmitted on a reporting link (e.g., link 1 102-1).

With reference to FIG. 7, the management frame 700 is shown as including eleven fields, implemented as a first field, Frame Control 702 (2 octets), a second field, Duration/ID 704 (2 octets), a third field, Address 1 706-1 (6 octets), a fourth field, Address 2 706-2 (0 or 6 octets), a fifth field, Address 3 706-3 (0 or 6 octets), a sixth field, Sequence Control 708 (0 or 2 octets), a seventh field, Address 4 706-4 (0 or 6 octets), an eighth field, QoS Control 710 (0 or 2 octets), a ninth field, HT Control 712 (0 or 4 octets), a tenth field, Frame Body 714 (variable octets), and an eleventh field, FCS 716 (4 octets). In an embodiment, a MAC Header portion, 718, of the management frame 700 includes Frame Control 702, Duration/ID 704, Address 1 706-1, Address 2 706-2, Address 3 706-3, Sequence Control 708, Address 4 706-4, QoS Control 710, and HT Control 712. In some embodiments, Frame Body 714 of the management frame 700 may include three subfields, implemented as a first subfield 720, a second subfield 721, and a third subfield 722. In such an embodiment, the third subfield 722 includes two subtype fields, implemented as a first subtype field 722-1 and a second subtype field 722-2.

With further reference to FIG. 7, in an embodiment, when the management frame 700 includes critical information (e.g., EDCA parameters, BSS Color Change, etc.) of a reported link (e.g., link 2 102-2) and is, e.g., a unicast Probe Response frame, a broadcast Probe Response frame, or a Beacon frame, the first subfield 720 may include information of a reporting link (e.g., link 1 102-1) for a Probe Response frame, the second subfield 721 may include a Reduced Neighbor Report (RNR), and the third subfield 722 may be an ML IE. In such an embodiment, the first subtype field 722-1 may include ML Common Info and the second subtype field 722-2 may include a Per-Link Profile with the critical information of the reported link.

With further reference to FIG. 7, in another embodiment, when the management frame 700 includes critical information (e.g., EDCA parameters, BSS Color Change, etc.) and other information (e.g., Group ID management for VHT DL MU transmission of a link) of a reported link (e.g., link 2 102-2) and is, e.g., a unicast Probe Response frame, a broadcast Probe Response frame, or an Action frame, the first subfield 720 may include information of a reporting link (e.g., link 1 102-1) for a Probe Response frame, the second subfield 721 may include an RNR, and the third subfield 722 may be an ML IE. In such an embodiment, the first subtype field 722-1 may include ML Common Info and the second subtype field 722-2 may include a Per-Link Profile with the critical information and the other information of the reported link.

Figure 8:
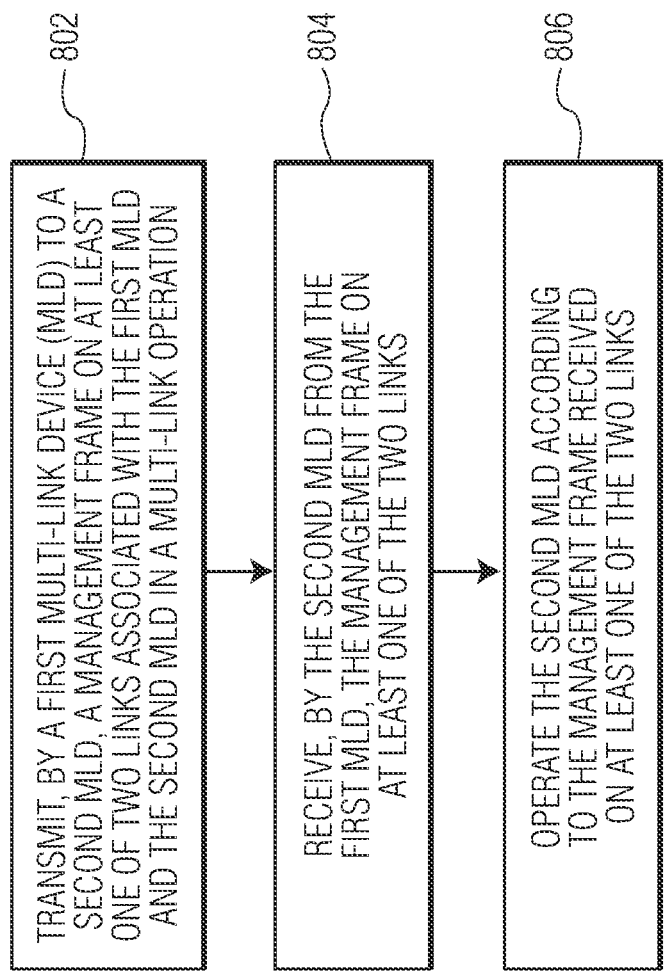
FIG. 8 illustrates a flow diagram of a technique for wireless communications in accordance with an embodiment of the invention.

FIG. 8 illustrates a flow diagram of a technique for wireless communications in accordance with an embodiment of the invention. At block 802, a first MLD may transmit to a second MLD, a management frame on at least one of two links associated with the first MLD and the second MLD in a multi-link operation. At block 804, the second MLD may receive from the first MLD, the management frame on at least one of the two links. At block 806, the second MLD may operate according to the management frame received on at least one of the two links.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless communications, the method comprising:
   transmitting, by a first multi-link device (MLD) to a second MLD, a management frame on at least one of two links associated with the first MLD and the second MLD in a multi-link operation, wherein the management frame is a cross-link link level management frame that includes information of a corresponding link of the two links associated with the first MLD and the second MLD in the multi-link operation and is transmitted on another link of the two links associated with the first MLD and the second MLD in the multi-link operation, and wherein support capability of the cross-link link level management frame is announced via an MLD Extremely High Throughput (EHT) capability or an MLD Capabilities element;
   receiving, by the second MLD from the first MLD, the management frame on at least one of the two links;
   operating the second MLD according to the management frame received on at least one of the two links;
   wherein the method involves transmitting the management frame via a cross-link transmission; and
   wherein transmitting the management frame via the cross-link transmission involves:
   transmitting an updated on-channel tunnel (OCT) Request frame on a reporting link; and encapsulating a reported link management frame.

2. The method of claim 1, wherein the management frame is an MLD level management frame.

3. The method of claim 2, wherein the MLD level management frame includes MLD level information.

4. The method of claim 2, wherein the MLD level management frame includes MLD level information and link level information.

5. The method of claim 4, wherein the link level information includes at least one of a link ID, a Group Temporal Key (GTK), an Integrity GTK (IGTK), and a Beacon IGTK (BIGTK) of at least one of the two links.

6. The method of claim 4, wherein the MLD level management frame that includes the MLD level information and the link level information is at least one of a Security Association (SA) Query Request frame, an SA Query Response frame, a Wireless Network Management (WNM) Request frame, and a WNM Response frame.

7. The method of claim 1, wherein the cross-link link level management frame includes a link ID that identifies the corresponding link for a frame body, and wherein the link ID is indicated in a Media Access Control (MAC) Header portion of the cross-link link level management frame.

8. The method of claim 1, wherein the cross-link link level management frame includes a link ID that identifies the corresponding link for a frame body, and wherein the link ID is indicated in the frame body of the cross-link link level management frame.

9. The method of claim 1, wherein when the cross-link link level management frame is transmitted on the corresponding link that uses a frame body, the link ID is not included in the frame body.

10. The method of claim 1, wherein when the cross-link link level management frame is transmitted on another link that is different from the corresponding link that uses a frame body, the link ID is included in the frame body.

11. The method of claim 1, wherein the management frame is a link-specific link level management frame that includes information of a corresponding link and is transmitted on the corresponding link.

12. The method of claim 11, wherein the link-specific link level management frame is not transmitted via a cross-link transmission.

13. The method of claim 11, wherein the link-specific link level management frame is at least one of a Time Priority Management frame, a management frame with a Timestamp field, a Transmit Power Control (TPC) Request frame, a TPC Response frame, a Link Measurement Request frame, a Link Measurement Response frame, a Target Wake Time (TWT) Information frame, an Operating Mode Notification frame, and a Spatial Multiplexing (SM) Power Save frame.

14. The method of claim 1, wherein the management frame transmitted via the cross-link transmission includes:
   information of one of the two links; and
   a link ID in a MAC Header portion of the management frame.

15. The method of claim 1, wherein the management frame transmitted via the cross-link transmission includes:
   information of more than one of the two links; and
   a link ID in a frame body of the management frame.

16. The method of claim 1, wherein at least one of the first MLD and the second MLD operates in accordance with an 802.11be communications protocol.

17. A wireless communications system, the wireless communications system comprising:
   a first multi-link device (MLD), wherein the first MLD includes a processor configured to:
   transmit, to a second MLD, a management frame on at least one of two links associated with the first MLD and the second MLD in a multi-link operation, wherein the management frame is a cross-link link level management frame that includes information of a corresponding link of the two links associated with the first MLD and the second MLD in the multi-link operation and is transmitted on another link of the two links associated with the first MLD and the second MLD in the multi-link operation, and wherein support capability of the cross-link link level management frame is announced via an MLD Extremely High Throughput (EHT) capability or an MLD Capabilities element; and
   a second MLD, wherein the second MLD includes another processor configured to:
   receive, from the first MLD, the management frame on at least one of the two links;
   operate according to the management frame received on at least one of the two links;
   wherein the method involves transmitting the management frame via a cross-link transmission; and
   wherein transmitting the management frame via the cross-link transmission involves:

transmitting an updated on-channel tunnel (OCT) Request frame on a reporting link; and encapsulating a reported link management frame.

\* \* \* \* \*